Aug. 12, 1952        A. B. JENNINGS        2,606,835

LIGHT-SENSITIVE PHOTOGRAPHIC ELEMENT

Filed Sept. 2, 1947

FIG. 1.

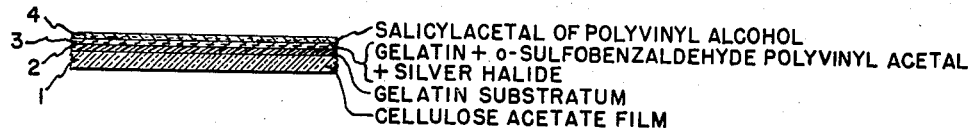

- SALICYLACETAL OF POLYVINYL ALCOHOL
- GELATIN + o-SULFOBENZALDEHYDE POLYVINYL ACETAL + SILVER HALIDE
- GELATIN SUBSTRATUM
- CELLULOSE ACETATE FILM

FIG. 2.

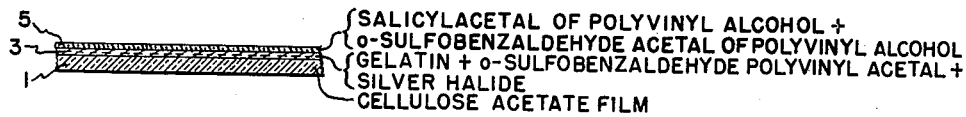

- SALICYLACETAL OF POLYVINYL ALCOHOL + o-SULFOBENZALDEHYDE ACETAL OF POLYVINYL ALCOHOL
- GELATIN + o-SULFOBENZALDEHYDE POLYVINYL ACETAL + SILVER HALIDE
- CELLULOSE ACETATE FILM

FIG. 3.

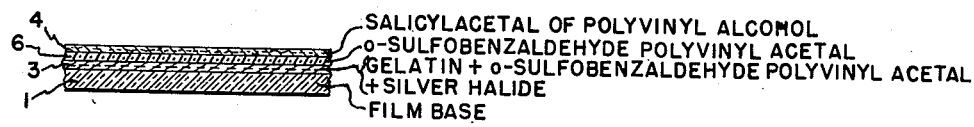

- SALICYLACETAL OF POLYVINYL ALCOHOL
- o-SULFOBENZALDEHYDE POLYVINYL ACETAL
- GELATIN + o-SULFOBENZALDEHYDE POLYVINYL ACETAL + SILVER HALIDE
- FILM BASE

FIG. 4.

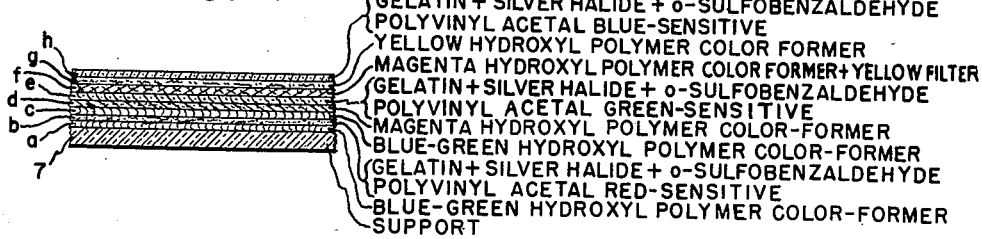

- GELATIN + SILVER HALIDE + o-SULFOBENZALDEHYDE POLYVINYL ACETAL BLUE-SENSITIVE
- YELLOW HYDROXYL POLYMER COLOR FORMER
- MAGENTA HYDROXYL POLYMER COLOR FORMER + YELLOW FILTER
- GELATIN + SILVER HALIDE + o-SULFOBENZALDEHYDE POLYVINYL ACETAL GREEN-SENSITIVE
- MAGENTA HYDROXYL POLYMER COLOR-FORMER
- BLUE-GREEN HYDROXYL POLYMER COLOR-FORMER
- GELATIN + SILVER HALIDE + o-SULFOBENZALDEHYDE POLYVINYL ACETAL RED-SENSITIVE
- BLUE-GREEN HYDROXYL POLYMER COLOR-FORMER
- SUPPORT

INVENTOR:
ANDREW BRADSHAW JENNINGS
BY
*Lynn Barratt Morris*
ATTORNEY.

Patented Aug. 12, 1952

2,606,835

UNITED STATES PATENT OFFICE 2,606,835

LIGHT-SENSITIVE PHOTOGRAPHIC ELEMENT

Andrew Bradshaw Jennings, New Brunswick, N. J., assignor to E. I. du Pont de Nemours & Company, Wilmington, Del., a corporation of Delaware Application September 2, 1947, Serial No. 771,699

7 Claims. (Cl. 95—9)

This invention relates to multilayer photographic elements and to their preparation. More particularly it relates to multilayer color films wherein light-sensitive silver salts and polymeric color formers are present in adjacent layers and to their preparation.

An object of this invention is to provide improved multilayer color films. A related object is to provide multilayer color films wherein polymeric color formers are used in layers adjacent to silver halide emulsion layers and have good adherence thereto. A further object is to provide a practical and effective means for adhering hydrophilic hydroxyl polymer color formers to coactive adjacent gelatino-silver halide emulsion layers. Still other objects will be apparent from the following description of the invention.

It has been discovered that hydrophilic hydroxyl polymer color former layers may be caused to fastly adhere to gelatino-silver halide emulsion layers by incorporating in the latter layers a small amount of a non-color-forming hydroxyl polymer. The hydroxyl polymer color formers and the hydroxyl polymers used in the gelatino-silver halide emulsion layer or layers with which they are intended to react are preferably of the same type. The gelatino-silver halide emulsion layers may be regarded as modified by the presence or addition of the non-color-forming hydroxyl polymers.

The water-permeable or hydrophilic hydroxyl polymer color formers comprehended by the invention consist of a linear polymer chain which has attached to recurring carbon atoms thereof a hydroxyl group and to the other recurring carbon atoms color former nuclei capable of forming azomethine or indophenol dyes through a covalent bond. The color former nuclei may be attached to recurring carbon atoms of the polymer chain through ether or acetal linkages. The hydrophilic hydroxyl color former polymeric polymers, in general, should contain at least one aliphatic hydroxyl group to every eight carbon atoms in the chain, i. e., 12.5 hydroxyl groups to every 100 chain atoms and preferably one to two hydroxyl groups for every five chain atoms, i. e., between 25 and 50 hydroxyl groups for every 100 chain atoms. The color former nuclei or radicals are attached to the polymeric chain ether directly or indirectly and it is preferred that for every 100 chain atoms there be present between one and 35 color former nuclei. These preferred hydrophilic, hydroxyl polymer color formers, moreover, should have a polymer chain containing more than 200 carbon atoms.

Suitable synthetic hydroxyl polymers that may be connected to color forming nuclei to produce the hydrophilic color forming hydroxyl polymers of the present invention include hydrolyzed polyvinyl esters, i. e., polyvinyl alcohols, hydrolyzed interpolymers of vinyl esters, e. g., vinyl acetate, vinyl propionate, and vinyl butyrate, etc., with olefins, e. g., ethylene, propylene, butene-1, and other vinyl compounds, e. g. acrylic acid, arcylic acid alkyl esters, alkyl methacrylates, vinyl chloride, vinyl cyanide, and maleic anhydride, and also the partial esters, ethers, and acetals of such polymers. These polymers may be connected to the color former nuclei by various intermediate-chemical groupings or linkages, such as, for example, carbonamide, sulfonamide, amino groups, acetal, ester, ether linkages, etc.

The resulting synthetic hydroxyl polymers contain a plurality of recurring intralinear vinyl alcohol (—CH$_2$—CHOH—) units.

The color former nuclei or components of the above synthetic polymers have as active coupling groups a structure which maw be represented as

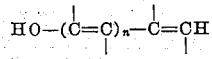

where $n$ is 0 or 1. This structure is found in color formers which contain a reactive acyclic or intracyclic methylene group and in aromatic hydroxyl compounds. These groups occur in phenols (including naphthols), pyrazolones, N-homophthalylamines, coumaranones, indoxyls, thioindoxyls, etc. The reactive groups may also be termed reactive methylene, reactive ethanol, and reactive 4-hydroxy-1,3-butadienyl groups. In all of the color former nuclei, the hydrogen atoms in the coupling position may be replaced by groups which are readily eliminated in the coupling reaction, e. g., halogen, e. g., chlorine and bromine, sulfonic acid, carboxylic acid, etc.

Suitable specific color formers of the above type are described in United States Patents 2,310,943, 2,320,422, 2,397,864, and 2,397,865.

The non-color-forming synthetic hydroxyl polymers should be colorless and free from groups which yield color on color coupling development so that accurate color reproducing can be attained. The polymers may be water-soluble or hydrophilic and contain a plurality of recurring intralinear vinyl alcohol (—CH$_2$—CHOH—) units. Suitable polymers of the water-soluble to hydrophilic type including polyvinyl alcohol and its partially hydrolyzed water-soluble lower fatty acid esters lower alkyl ethers, and lower acetals have been proposed as silver halide binding agents for photographic elements. Polyvinyl alcohol is a tough, water-white, polymeric, film-forming material. It is soluble in water. The more highly polymerized varieties are soluble in hot water and the medium or lower polymers are soluble in cold water. They are usually prepared by hydrolysis of polyvinyl esters, such as polyvinyl acetate, polyvinyl chloracetate, polyvinyl isobutyrate, etc. The partly hydrolyzed esters which contain a large number of recurring vinyl alcohol units (—CH$_2$—CHOH—) are water-soluble in character. The ethers can be made by incompletely etherifying the completely or partially hydrolyzed polyvinyl acetate, etc. The polyvinyl acetals, e. g., polyvinyl acetaldehyde acetal and polyvinyl isobutyral, can be made by acetalization of polyvinyl alcohol and its incompletely hydrolyzed carboxylic acid esters.

In addition to the water-soluble and hydrophilic synthetic hydroxyl polymers just described, there may be mentioned partially and completely hydrolyzed polyvinyl esters, e. g., vinyl acetate and copolymers thereof with ethylenically unsaturated compounds, such as vinyl chloride and styrene; acrylic acid esters, e. g., methyl acrylate; methacrylic acid esters, e. g., methyl methacrylate; and mono-olefines, e. g., ethylene. The completely hydrolyzed ethylene/vinyl acetate copolymer emulsion described in McQueen 2,397,866 and Roland 2,386,347 forms an important class of silver halide emulsions which can advantageously be coated by the improved methods in question.

The hydrophilic hydroxyl polymer color formers are dissolved in hot water or a mixture of water and a water-miscible volatile solvent, e. g., methanol, ethanol, propanol, acetone, ethylene glycol, ethylene glycol mono-methyl or ethyl ether, etc., and coated onto the gelatin silver halide emulsion layer which contains a colorless hydroxyl polymer free from color former nuclei by any of the conventional coating procedures, e. g., dipping or immersion, spraying, coating from hoppers, by means of beading rollers, etc.

The gelatino-silver halide emulsion layers should contain from 0.05 to 0.5 part of a non-color-forming synthetic hydroxyl polymer as described above per part of gelatin. They can be made by adding the said hydroxyl polymer to the emulsion at any time prior to coating. They are preferably added after the gelatino-silver halide emulsions have been prepared, washed, and sensitized from water solutions or from water containing from 5 to 20% of methanol or ethanol with stirring at 15° to 30° C. Acetone, dioxane solutions, and water mixtures of such solvents may also be used.

The silver halide emulsion layers just described can be coated in the same manner that ordinary silver halide emulsions are coated. The presence of the hydroxyl polymers requires no special coating technique or equipment.

Small amounts of the colorless, synthetic, hydroxyl polymers, free from color former nuclei, can be admixed with the hydroxyl polymer color formers, if desired, to dilute the same and thereby reduce the amount of color former nuclei per amount of silver halide in the adjacent layer and to enhance the anchorage of the two layers to each other. Moreover, thin layers of the colorless hydroxyl polymers may be intercalated between the color former layer and the modified gelatino-silver halide emulsion layer, if desired. The intermediate strata should be so thin that it does not prevent coaction and color coupling development between the color former and developer reduction products of the silver halide grains.

The invention will be further illustrated by the following examples.

Example I

A cellulose acetate film base 1 as shown in Fig. 1 of the drawing which constitutes a part of this specification which was provided with a thin gelatin anchoring substratum 2 was coated at 90° F. from a dispersion of the following composition:

| | Grams |
|---|---|
| Gelatino-silver iodobromide emulsion (positive type) | 100.0 |
| o-Sulfobenzaldehyde acetal of polyvinyl alcohol | 5.0 |
| Water | 100.0 |

The resulting layer 3, after drying, was coated with a color former layer 4 from the following solution:

| | | |
|---|---|---|
| Salicylacetal of polyvinyl alcohol | grams | 10.0 |
| Ethanol | cc | 25.5 |
| Water | cc | 100.0 |

After drying, the resulting element was exposed to an object field and developed with p-aminodiethylaniline and the silver and silver salts were removed whereby a blue-green dye image was formed. The coatings had unusually good and uniform adherence in the wet and dry state. A similar film made by eliminating the o-sulfobenzaldehyde acetal from the silver halide emulsion layer had noticeably less adherence and uniformity.

Example II

A cellulose acetate film base 1 as shown in Fig. 2 of the drawing bearing a silver halide emulsion layer 3 of the type described in Example I was made and on the emulsion layer there was coated a color former layer 5 from a solution of the composition:

| | | |
|---|---|---|
| Salicylacetal of polyvinyl alcohol | grams | 5.0 |
| o-Sulfobenzaldehyde acetal of polyvinyl alcohol | grams | 5.0 |
| Ethanol | cc | 25.5 |
| Water | cc | 80.0 |

After the film was dried and exposed, color developed, and the silver and silver salts were removed, the film had the characteristics described in Example I.

Example III

A film 1 as shown in Fig. 3 of the drawing bearing a silver halide emulsion layer 3 was made as described in Example I. On the layer 3 there was coated a thin layer from the composition:

| | | |
|---|---|---|
| o-Sulfobenzaldehyde acetal of polyvinyl acetal | grams | 5.0 |
| Ethanol | cc | 50.0 |
| Water | cc | 50.0 |

There was then deposited on the latter layer a color former layer as described in Example I. It had characteristics similar to those described in said example.

Film elements similar to those described in Example I were made by applying the respective coating solutions in reverse order. This results in the silver halide layer being outermost. The invention is not limited to single color layer elements as additional color former and modified gelatino-silver halide emulsion layers can be added in like manner. In the case of a monopack for three-color photography, the light-sensitive layers are so arranged and sensitized that each layer is adapted to record light in one primary color region of the spectrum different from the other two layers. In addition, a layer or stratum which contains a yellow filter dye is placed before the layers which are adapted to record green and red light. Each light-sensitive layer has the characteristics described above; that is, it contains a gelatin binding agent modified by the addition of a hydroxyl polymer. The coactive adjacent color former layers contain color nuclei which yield dyes which are complementary in color to the utilized sensitivity of the emulsion layers.

A practical element for three-color photography thus may consist of a support 7 as shown in Fig. 4 of the drawing which has superposed upon one side thereof in order the following layers:

a. A hydrophilic blue-green hydroxyl polymer color former;

b. A gelatino-silver iodobromide emulsion layer which is sensitive to red light and is modified by the presence of o-sulfobenzaldehyde acetal of polyvinyl alcohol;

c. A layer like layer a;

d. A hydrophilic magenta hydroxyl polymer color former;

e. An emulsion layer like layer b but which is sensitized for green light;

f. A layer like layer d but containing a yellow filter element;

g. A hydrophilic yellow hydroxyl polymer color former; and h. A blue-sensitive gelatino-silver iodobromide emulsion which is modified by the addition of o-sulfobenzaldehyde acetal of polyvinyl alcohol.

Another practical element for three-color photography which is particularly useful for reversal processing may consist of a support which has superposed on one side thereof in order the following layers:

1. A hydrophilic blue-green hydroxyl polymer color former;

2. A gelatino-silver iodobromide emulsion layer which is sensitive to red light;

3. A hydrophilic magenta hydroxyl polymer color former;

4. A gelatino-silver iodobromide emulsion layer which is sensitive to green light;

5. A hydrophilic yellow hydroxyl polymer color former which contains a yellow light filter dye; and 6. A gelatino-silver iodobromide emulsion which is sensitive to blue light.

The film element just described may be exposed to colored objects and processed by direct color development or by a reversal method.

A large number of hydrophilic hydroxyl polymer color formers are known which are useful in the novel photographic elements of this invention. Suitable color formers are described in United States Patents 2,310,943, 2,320,422, 2,380,023, 2,380,033, 2,397,864, and 2,397,865. Among the specific polymeric color formers described in such patents which are particularly useful are the polyvinyl acetals of 1,2-hydroxynaphthaldehyde, salicylaldehyde, m(1-naphthol-2-sulfonamido)benzaldehyde, 1-(3-formylphenyl)-3-methyl-5-pyrazolone, 1-hydroxy-2-naphthamidobenzaldehyde (prepared as described in United States application Serial Number 758,988, filed July 3, 1947), now abandoned, 1-(4-formylphenyl)-3-methyl-5-pyrazolone, 1-(2-formylphenyl)-3-methyl-5-pyrazolone, o-, m-, and p-acetoacetamidobenzaldehyde, m-benzoylacetamidobenzaldehyde, 3-brom-2-hydroxybenzaldehyde, m-[p-(5-ethylcarbonato-3-methyl-1-pyrazolyl)-benzamido]benzaldehyde, 2-hydroxy-3-nitrobenzaldehyde, 6-hydroxy-2-methylbenzaldehyde, 2-hydroxy-5-methylbenzaldehyde, and p-hydroxy-phenylacetaldehyde.

An advantage of the invention resides in the fact that it provides a means for improving an adherence between gelatin silver halide layers and diverse hydroxy-polymer color former layers. The elements have the advantage that the color formers being in separate substrata do not adversely affect the speed and sensitivity of the coactive silver halide emulsion layers.

The satisfactory adherence of a non-gelatin, synthetic polymer color former to a highly sensitive, gelatin emulsion permits the full, simultaneous realization of the advantages of both, not hitherto attainable except separately.

As many widely different embodiments of this invention can be made without departing from the spirit and scope thereof, it is to be understood that the invention is not to be limited except as defined by the claims.

What is claimed is:

1. A photographic element comprising a sheet support bearing a layer of light-sensitive, gelatino-silver halide emulsion admixed with a synthetic hydroxyl polymer and in contact with said emulsion layer at least one light-sensitive layer composed of a synthetic hydroxyl polymer containing a plurality of color-former nuclei linked to the polymer chain, said nuclei possessing a structure of the formula:

$$HO-(\overset{|}{C}=\overset{|}{C})_n-\overset{|}{C}=\overset{|}{C}H$$

where $n$ is a cardinal number from 0 to 1, said hydroxyl polymer in both cases being water-soluble to hydrophilic in character and containing a plurality of recurring intralinear

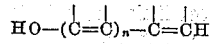

$-CH_2-\overset{|}{C}HOH$ groups

2. A photographic film comprising a film support bearing a layer of light-sensitive, gelatino-silver halide emulsion admixed with a synthetic hydroxyl polymer and in contact with said layer at least one light-insensitive layer composed of a hydroxyl polymer containing a plurality of color-former nuclei linked to the polymer chain, said nuclei possessing a structure of the formula $$HO-(\overset{|}{C}=\overset{|}{C})_n\overset{|}{C}=\overset{|}{C}H$$

where $n$ is a cardinal number from 0 to 1, said hydroxyl polymers in both cases being water-soluble to hydrophilic in character and containing a plurality of recurring intralinear

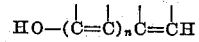

$-CH_2-\overset{|}{C}HOH$ groups

3. The photographic film comprising a film support bearing a layer comprising a light-sensitive, gelatino-silver halide emulsion admixed with a colorless linear hydroxyl polymer which is water-soluble to hydrophilic in character, free from color-former nuclei and contains a plurality of recurring intralinear

$-CH_2-\overset{|}{C}HOH$ groups at least one light-insensitive layer composed of a synthetic hydroxyl polymer which is water-soluble to hydrophilic in character and has a plurality of color-former nuclei linked to the polymer chain, said nuclei possessing a structure of the formula $$HO-(\overset{|}{C}=\overset{|}{C})_n\overset{|}{C}=\overset{|}{C}H$$

where $n$ is a cardinal number from 0 to 1 in contact with the said emulsion layer.

4. A photographic film comprising a film support bearing a layer comprising a light-sensitive, gelatino-silver halide emulsion admixed with a colorless polyvinyl acetal which is free from color-former nuclei, water-soluble to hydrophilic in character and contains a plurality of recurring intralinear $$-CH_2-\overset{|}{C}HOH \text{ groups}$$

and having in intimate contact with said emulsion layer, a light-insensitive layer composed of a polyvinyl acetal color-former which is water-soluble to hydrophilic in character and contains a plurality of color-former nuclei linked to the polymer chain of said polyvinyl acetal through an acetal linkage, said nuclei possessing a structure of the formula $$HO-(\overset{|}{C}=\overset{|}{C})_n\overset{|}{C}=\overset{|}{C}H$$

where $n$ is a cardinal number from 0 to 1.

5. A photographic film comprising a film support bearing a layer comprising a light-sensitive, gelatino-silver halide emulsion admixed with an o-sulfobenzaldehyde acetal of polyvinyl alcohol and having in intimate contact with said emulsion layer at least one light-insensitive layer composed of a polyvinyl acetal color-former which is water-soluble to hydrophilic in character and contains a plurality of color-former nuclei linked to the polymer chain of said polyvinyl acetal through an acetal linkage, said nuclei possessing a structure of the formula $$HO-(\overset{|}{C}=\overset{|}{C})_n\overset{|}{C}=\overset{|}{C}H$$

where $n$ is a cardinal number from 0 to 1.

6. A photographic film comprising a film support bearing a layer of light-sensitive gelatino silver halide emulsion admixed with a colorless, linear hydroxyl polymer which is water soluble to hydrophilic in character, free from color-former nuclei and contains a plurality of recurring intralinear $$-CH_2-\overset{|}{C}HOH \text{ groups}$$

and in contact with the light-sensitive layer a light-insensitive layer composed of a polyvinyl alcohol acetal-color former which is water soluble to hydrophilic in character and has a plurality of color-former nuclei linked to the polymer chain, said nuclei possessing a structure of the formula:

$$HO-(\overset{|}{C}=\overset{|}{C})_n\overset{|}{C}=\overset{|}{C}H$$

where $n$ is a cardinal number from 0 to 1.

7. A photographic film comprising a film support bearing a layer of light-sensitive gelatino silver halide emulsion admixed with an o-sulfobenzaldehyde acetal of polyvinyl alcohol which contains a plurality of recurring intralinear $$-CH_2-\overset{|}{C}HOH \text{ groups}$$

and in contact with the light-sensitive layer a light-insensitive layer composed of a polyvinyl alcohol acetal-color former which is water soluble to hydrophilic in character and has a plurality of color-former nuclei linked to the polymer chain, said nuclei possessing a structure of the formula:

$$HO-(\overset{|}{C}=\overset{|}{C})_n\overset{|}{C}=\overset{|}{C}H$$

where $n$ is a cardinal number from 0 to 1.

ANDREW BRADSHAW JENNINGS.

REFERENCES CITED

The following references are of record in the file of this patent:

UNITED STATES PATENTS

| Number | Name | Date |
|---|---|---|
| 1,752,069 | De Stubner | Mar. 25, 1930 |
| 2,054,284 | Forstmann | Sept. 15, 1936 |
| 2,146,907 | Nadeau | Feb. 14, 1939 |
| 2,269,158 | Martinez | Jan. 6, 1942 |
| 2,272,191 | Fierke | Feb. 10, 1942 |
| 2,312,852 | Toland et al. | Mar. 2, 1943 |
| 2,350,380 | White | June 6, 1944 |
| 2,397,452 | White | Mar. 26, 1946 |
| 2,462,151 | Woodward | Feb. 22, 1949 |